US010006821B1

(12) United States Patent
Boger (10) Patent No.: US 10,006,821 B1
(45) Date of Patent: Jun. 26, 2018

(54) DEFLECTION DETECTION SYSTEM UTILIZING AN ENERGIZED BEAM

(71) Applicant: Altec Industries, Inc., Birmingham, AL (US)

(72) Inventor: David K. Boger, Sonoma, CA (US)

(73) Assignee: Altec Industries, Inc., Birmingham, AL (US)

( * ) Notice: Subject to any disclaimer, the term of this patent is extended or adjusted under 35 U.S.C. 154(b) by 0 days. days.

(21) Appl. No.: 15/397,820

(22) Filed: Jan. 4, 2017

(51) Int. Cl.
| *G01L 1/24* | (2006.01) |
|---|---|
| *G01L 19/12* | (2006.01) |
| *G01B 11/16* | (2006.01) |
| *E21B 7/04* | (2006.01) |

(52) U.S. Cl.
CPC .............. *G01L 1/24* (2013.01); *G01L 19/12* (2013.01); *E21B 7/046* (2013.01); *G01B 11/16* (2013.01)

(58) Field of Classification Search
CPC ..... E21B 7/046; E21B 47/024; G02B 6/4415; B66C 23/90; B66C 13/16; B66C 13/18; B66C 15/00; B66C 15/06; G01B 11/16
See application file for complete search history.

(56) References Cited

U.S. PATENT DOCUMENTS

| 7,783,003 | B2 * | 8/2010 | Clayton | G01N 23/04 212/270 |
|---|---|---|---|---|
| 9,573,797 | B1 * | 2/2017 | Beck | B66F 17/006 |
| 2007/0188742 | A1 * | 8/2007 | Gunsaulis | E21B 7/046 356/138 |
| 2011/0102765 | A1 * | 5/2011 | Ruggiero | G01L 5/0009 356/32 |
| 2011/0315164 | A1 * | 12/2011 | DesOrmeaux | B08B 9/0933 134/21 |
| 2012/0168251 | A1 * | 7/2012 | Baxter | B66C 23/205 182/129 |
| 2014/0232208 | A1 * | 8/2014 | Yamaguchi | B66C 13/40 307/154 |
| 2015/0149026 | A1 * | 5/2015 | Oswald | B66C 13/18 701/29.3 |
| 2016/0049849 | A1 * | 2/2016 | Boger | H02K 7/1823 182/129 |
| 2016/0060081 | A1 * | 3/2016 | Higgins | B66C 23/66 212/347 |

FOREIGN PATENT DOCUMENTS

| CN | 102798350 A | 11/2012 |
|---|---|---|
| CN | 104528527 A | 4/2015 |

\* cited by examiner

*Primary Examiner* — Sang Nguyen
(74) *Attorney, Agent, or Firm* — Erise IP, P.A.

(57) ABSTRACT

A deflection detection system determines a deflection of a boom assembly. The deflection detection system may include a beam source, a beam target, and a processor. The beam source is configured to be installed into a hollow boom section at a first end and configured to emit a beam. The beam target configured to be installed into the hollow boom section at a second end that is opposite the first end. The processor is configured to instruct the beam source to emit the beam; acquire a first target-impact indication that is associated with a first impact location of the beam on the beam target; acquire a second target-impact indication that is associated with an impact location of the beam on the beam target; and determine a deflection of the hollow boom section based at least in part on the first target-location and the second target-location indication.

19 Claims, 9 Drawing Sheets

DEFLECTION DETECTION SYSTEM UTILIZING AN ENERGIZED BEAM

BACKGROUND

1. Field

Embodiments of the invention relate to aerial devices. More specifically, embodiments of the invention relate to the detection of deflection of insulated boom sections.

2. Related Art

Utility workers utilize an aerial device to reach inaccessible locations. The aerial device generally includes a boom assembly with a utility platform assembly 16 connected to a distal end of the boom. One or more utility workers stand in the utility platform assembly. Utility workers typically use an aerial device to access overhead electric power lines and electric power components for installation, repair, or maintenance. The utility workers may also lift repair parts and other objects utilizing a jib associated with the utility platform assembly. The utility platform assembly and at least one boom section are highly insulated so as to prevent the discharge of electricity through the utility truck, and especially through the utility worker. Because at least one boom section is formed of fiberglass, or another polymer, structural strength of the boom is a consideration.

Manufacturers often provide information on allowable boom loads to avoid structural damage to the fiberglass boom sections. Not exceeding these allowable limits is important due to the increased likelihood of catastrophic fiberglass boom section failure following overloading conditions. A limitation of the manufacturer-provided information is the user's lack of available equipment and methods to conveniently and accurately determine the boom load. A complication for the user in determining the load limit is that the limit varies with the upper and lower boom position relative the earth and relative to each other. This complication causes many users confusion in determining maximum allowable load and as a result this determination is not made. Further, users may not be aware of the actual load that they will apply to the boom as is the case, for example, in supporting a power and communications cable when the cable is temporarily removed from a utility pole during a repair procedure. Instead, users often rely on their intuitive judgement to assess the degree of load, endangering the user and the boom structure.

SUMMARY

Embodiments of the invention solve the above-mentioned problems by providing a deflection detection system for preventing damage to an insulated boom. The deflection detection system directly measures deflection of the upper boom section 30, which is typically formed of fiberglass or another dielectric material. The deflection detection system measures the deflection by applying a beam from a first end of the boom to a second end. The beam is substantially straight. As the second end deflects downward due to loads on the boom, this deflection can be measured by noting the difference in impact location of the beam.

A first embodiment of the invention is directed to a deflection detection system comprising a beam source, a beam target, and a processor. The beam source is configured to be installed into a hollow boom section at a first end and configured to emit a beam. The beam target configured to be installed into the hollow boom section at a second end that is opposite the first end. The processor is configured to instruct the beam source to emit the beam; acquire a first target-impact indication that is associated with a first impact location of the beam on the beam target; acquire a second target-impact indication that is associated with an impact location of the beam on the beam target; and determine a deflection of the hollow boom section based at least in part on the first target-location and the second target-location indication.

A second embodiment of the invention is directed to a deflection detection system comprising a beam source, a beam target, and a processor. The beam source configured to be installed on a boom section at a first end and configured to emit a beam. The beam target is configured to be installed the boom section at a second end that is opposite the first end. The beam source is configured to emit the beam to the beam target. The processor configured to detect a deflection of the boom section based at least in part on where the beam strikes the beam target.

A third embodiment of the invention is directed to a deflection detection system that comprises a hollow boom section, a beam source, and a beam target. The hollow boom section has a first end and a second end opposite the first end, and presents a void therein. The beam source is installed in the void of the hollow boom section at the first end and is configured to emit a beam. The beam target installed in the hollow boom section at a second end that is opposite the first end. The beam source is directed to the beam target such that a deflection of the hollow boom section may be detected based at least in part on where the beam impacts the target.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
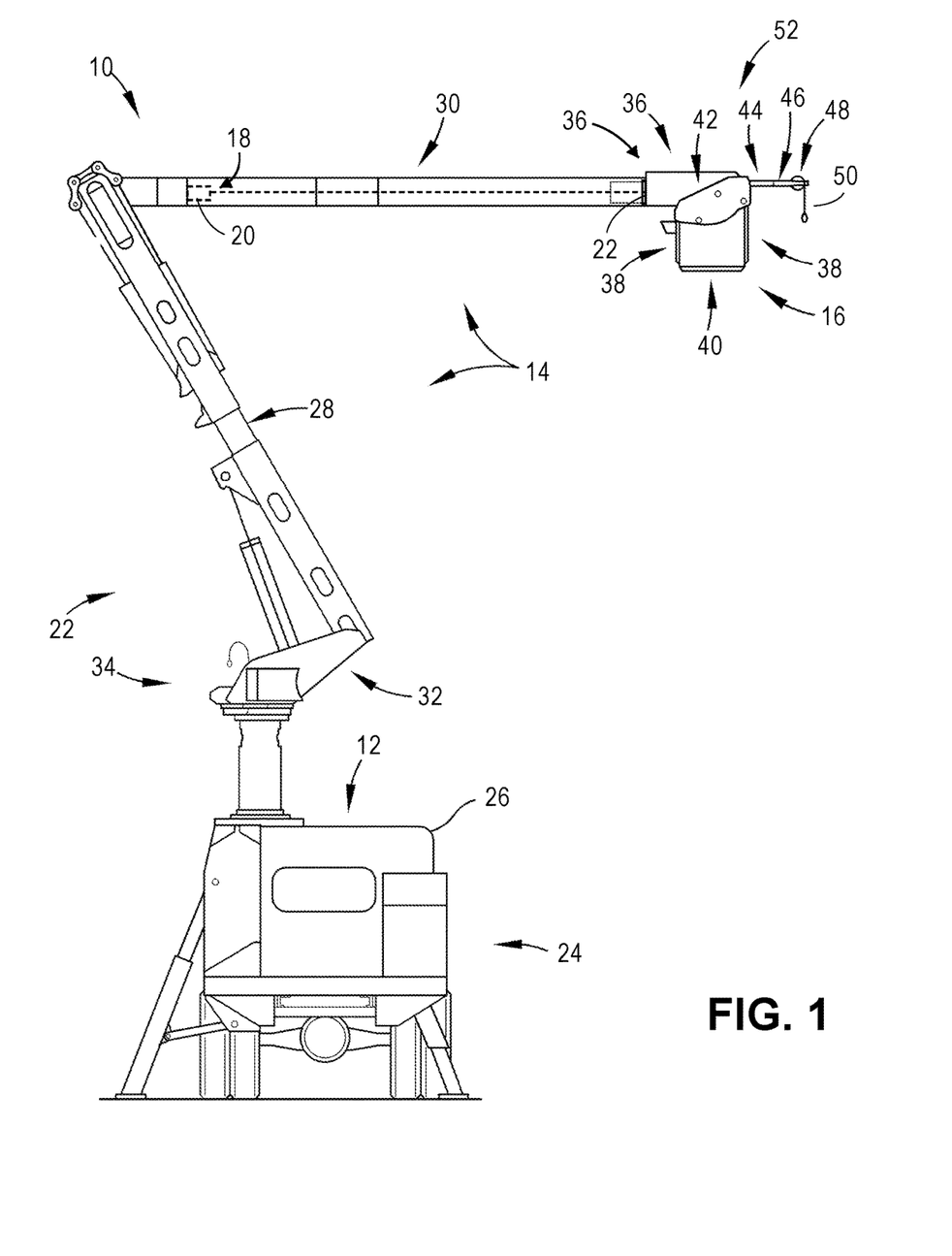
FIG. 1 is an environmental view of an aerial device with a boom assembly a utility platform assembly, and a working jib, illustrated free of a load.

An aerial device 10, constructed in accordance with various embodiments of the invention, is shown in FIG. 1. The aerial device 10 generally comprises a base 12 with a boom assembly 14 rotatably mounted thereto. A utility platform assembly 16 is disposed on the boom assembly 14 to provide an aerial platform for the accomplishment of a task by a utility worker. A deflection detection system 18 identifies excessive loads on the boom assembly 14. In embodiments of the invention, the deflection detection system 18 comprises a beam source 20 and a beam target 22. The deflection detection system 18 may also include an alarm 24 for alerting the utility worker that a potential dangerous strain is being experienced.

Before discussing the deflection detection system 18 in detail, the components of the aerial device 10 generally will be discussed. The base 12 of the aerial device 10 is a selectively stabilized platform. In embodiments of the invention, the base 12 is a utility truck 26 (as illustrated in FIG. 1), a crane base, an oilrig, an earth-working machine, or a fixed structure. The base 12 provides stability and a counterweight to a load being supported by the boom assembly 14.

The boom assembly 14 broadly comprises a lower boom section 28 and at least one insulated upper boom section 30. It should be appreciated that the majority of the present disclosure is concerned with the detection of strain within the upper boom section 30, which will commonly be referred to as an "insulated boom section" 30 because other boom sections may also be insulated for safety reasons. Because insulating a boom, such as by forming it of a polymer, significantly reduces the structural strength, monitoring the strain thereon can prevent structural failure.

As illustrated in FIG. 1, some embodiments of the boom assembly 14 may further comprise at least one pivoting boom section 32. The boom assembly 14 presents a proximal end 34 and a distal end 36. The proximal end 34 is rotatably and/or pivotably secured to a portion of the base 12. The distal end 36 is secured to the utility platform assembly 16. In some embodiments, the at least one upper boom section 30 is at least in part disposed within the lower boom section 28. The at least one upper boom section 30 telescopes to extend or retract into the lower boom section 28. In other embodiments, the upper boom section 30 pivots relative to the lower boom section 28, such as illustrated in FIG. 1. The pivoting boom section 32 does not telescope out of any other boom section. Instead the pivoting boom section 32 rotates about the base 12, and the lower boom section 28 pivots and/or rotates relative to the pivoting boom section 32. The use of the pivoting boom section 32 allows the utility platform assembly 16 to reach certain areas and avoid obstacles in the working environment.

Figure 5A:
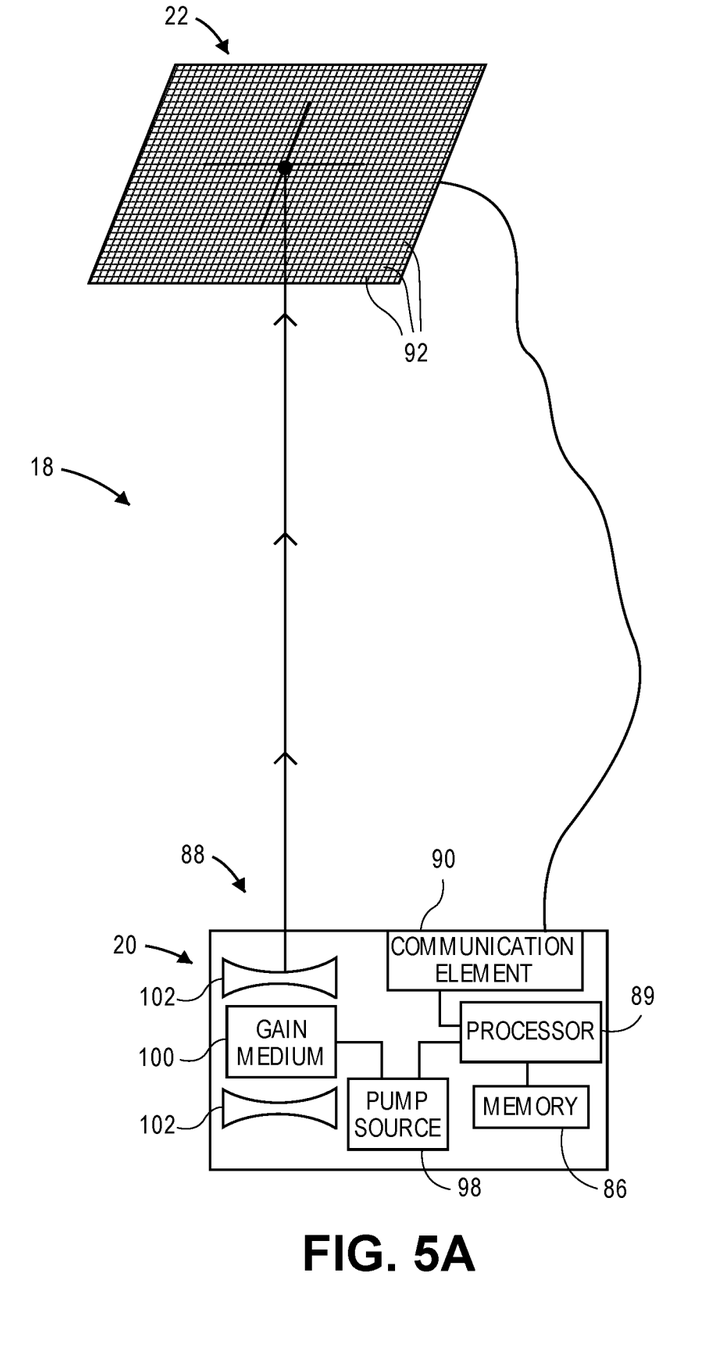
FIG. 5A is a schematic view of an unloaded first embodiment of the deflection detection system, having a beam target that detects the beam impact.
Figure 5B:
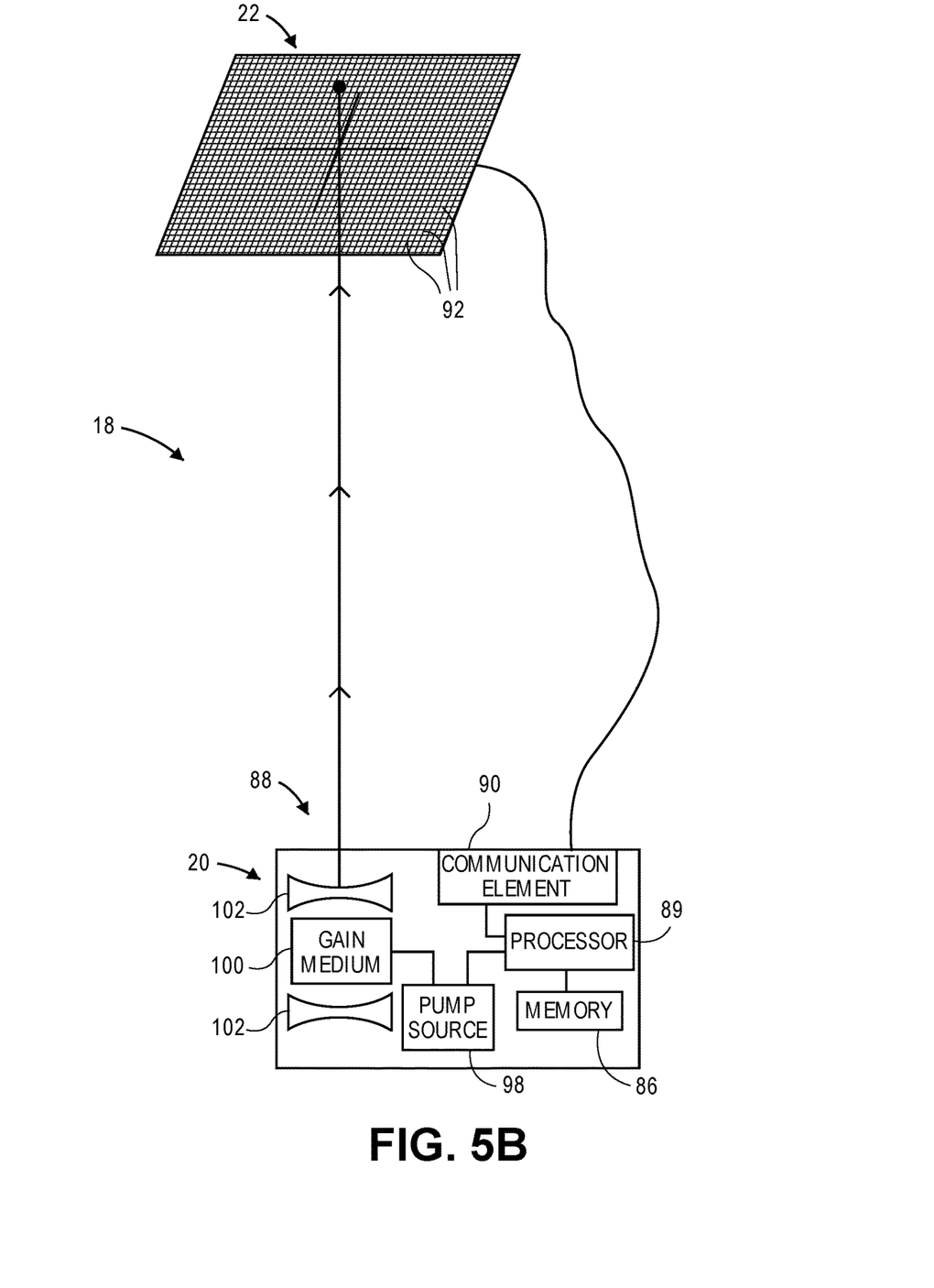
FIG. 5B is a schematic view of a loaded first embodiment of the deflection detection system, having a beam target that detects the beam impact

The utility platform assembly 16 provides an elevated surface from which at least one utility worker can perform a task. As illustrated in FIG. 5, embodiments of the utility platform assembly 16 comprise four bucket sidewalls 38 and a bucket floor 40 that collectively form a cavity 42. The utility platform assembly 16 may also present a bucket lip along a top portion of at least one bucket sidewall 38. The utility platform assembly 16 may further comprise a step and/or a door (not illustrated) in at least one of the bucket sidewalls 38 to allow for ingress and egress of the utility worker. The utility platform assembly 16 may also comprise a handrail (not illustrated).

The four bucket sidewalls 38 and the bucket floor 40 of the utility platform form the cavity 42. The four bucket sidewalls 38 may be unitary, i.e. formed of a single monolithic structure, or they may be coupled together. The transition between successive bucket sidewalls 38, and/or between the bucket sidewalls 38 and the bucket floor 40, may be rounded or arcuate. In some embodiments, the utility platform assembly 16 presents a horizontal cross-section that is substantially rectangular. Thus, two of the opposing bucket sidewalls 38 may have a greater width than the other two opposing bucket sidewalls 38. In other embodiments, the utility platform assembly 16 presents a horizontal cross-section that is substantially square. Other embodiments of the utility platform assembly 16 may be other shapes about the horizontal cross-section, such as an ellipse, a circle, a D-shape, a triangle, a trapezoid, a rhombus, or other quadrilateral.

In embodiments of the invention, a working jib 44 is disposed at the distal end 36 of the boom assembly 14. In some embodiments, the working jib 44 may be disposed on or adjacent to the utility platform assembly 16. Typically, the working jib 44 is secured to the distal end 36 of the boom assembly 14 independently from the utility platform assembly 16. This is because the working jib 44 and the utility platform assembly 16 typically move independently from one another, and also to allow the working jib 44 to support a larger load. The working jib 44 includes a jib arm 46, a winch 48, and a load line 50 disposed from the jib arm 46. The winch 48 lets out and takes up the load line 50, which is directed downward overt the jib arm 46.

The working jib 44 is typically utilized by the utility worker to raise and lower various repair parts, damaged parts, tools, and the like. Because the utility platform assembly 16 may not be able to support all the weight (and/or all the space) of the utility worker, the tools, the repair part, and the removed parts; the working jib 44 is utilized to selectively raise and lower parts and tools as needed. It should be noted that an implement 52, as described herein, may refer to the working jib 44, the utility platform assembly 16, or another tool disposed at the distal end 36 of the boom assembly 14. Other examples of implements 52 could include digger derricks, pole guides, luffing jibs, crane booms, winches, safety equipment, and the like.

Figure 2:
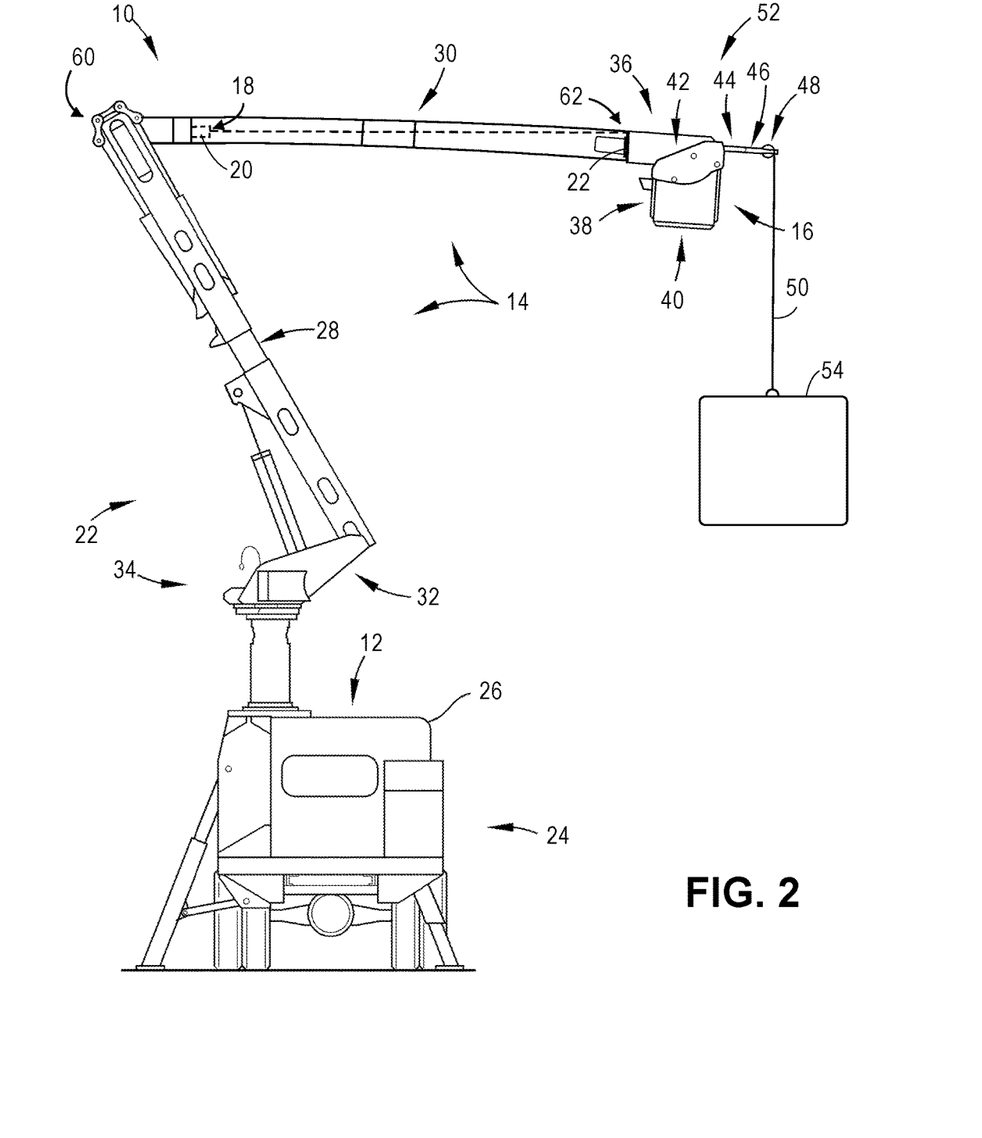
FIG. 2 is an environmental view of the aerial device of FIG. 1, illustrated under a load such that an upper boom section has deflected downward.

FIG. 2 illustrates the aerial device 10 of FIG. 1 under a load 54. As can be seen, a distal end 56 of the upper boom section 30 is deflected downward due to a load 54. A proximal end 58 of the upper boom section 30 remains substantially in the original orientation. It should be appreciated that the deflection as illustrated in FIG. 2 is more pronounced than is typical for an upper boom section 30. The exaggerated deflection is provided to orient the reader to concepts described.

It should be noted in FIG. 2 that the intersection between the upper boom section 30 and the lower boom section 28 may be referred to as an elbow 60 of the boom assembly 14, and the intersection between the upper boom section 30 and the utility platform assembly 16 may be referred to as a knuckle 62 of the boom assembly 14. The upper boom section 30 may therefore present an elbow end (adjacent to the elbow 60, which may also be referred to as the proximal end 58) and a knuckle end (adjacent to the knuckle 62, which may also be referred to as the distal end 56). It should be noted that in embodiments, the deflection that is measured by the deflection detection system 18 is within the upper boom section 30, not between the upper boom section 30 and another component (such as the elbow 60). This is because in many instances the point of failure for the boom assembly 14 is in the upper boom section 30, being formed of a polymer or other dielectric material, as opposed to other metallic components of the boom section (such as the lower boom section 28).

The deflection detection system 18 is configured to determine a load disposed from an implement 52 (such as a utility platform assembly 16, a working jib 44, a load 54, or other implement 52) at a distal end 56 of the insulated boom section 30, or to provide an indication of the load disposed from an implement 52. The weight of the implement 52 (as well as the weight of any load 54 suspended in or on the implement 52) is therefore determined at least in part by the deflection detection system 18, as discussed more below.

Figure 3:
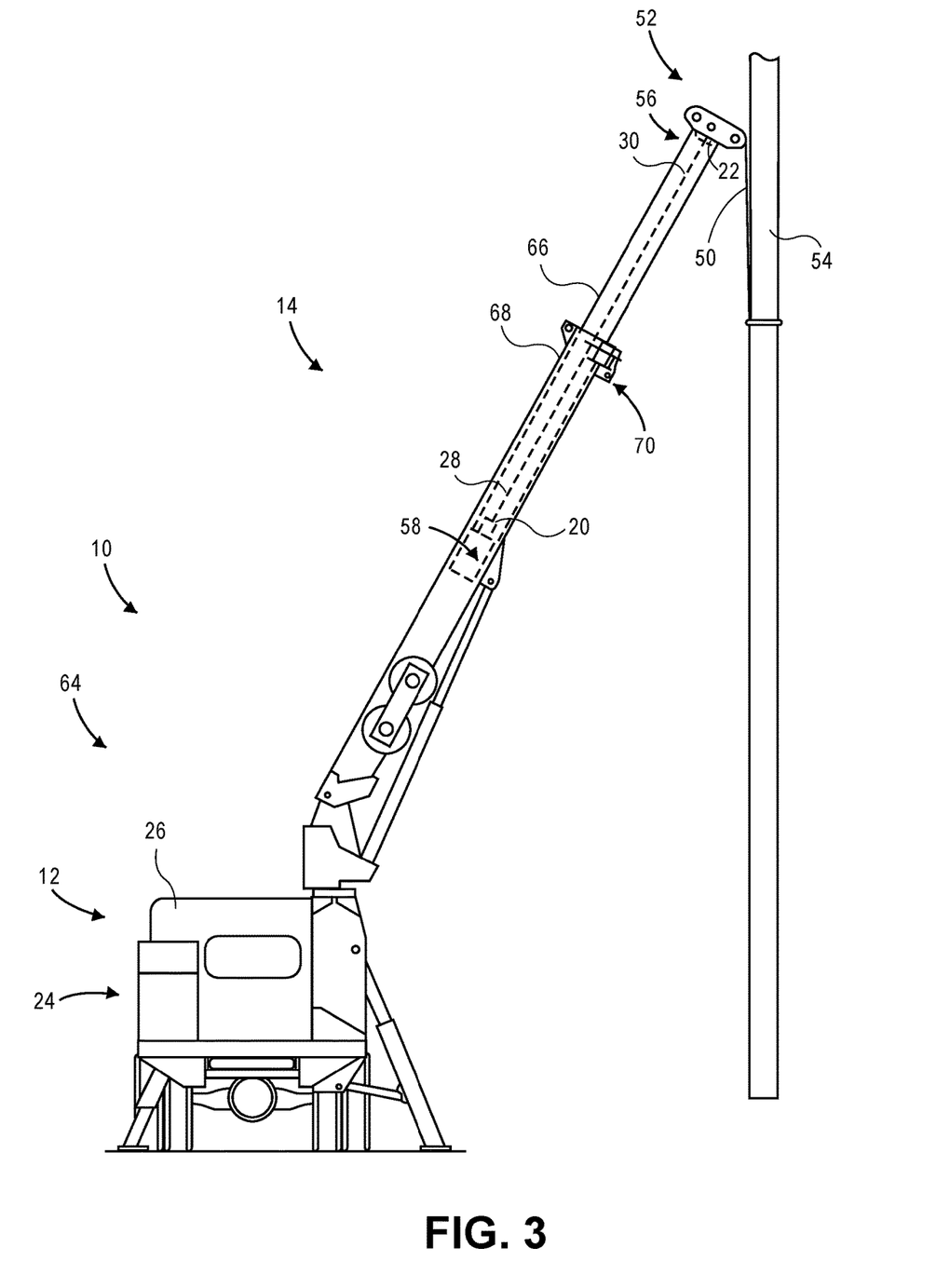
FIG. 3 is an environmental view of a crane, illustrated under a load.

FIG. 3 illustrates an aerial device 10 that is a crane 64. The boom assembly 14 of the crane 64 telescopes. This is distinct from the boom assembly 14 of FIGS. 1 and 2 in which the upper boom section 30 pivoted relative to the lower boom section 28. Boom assemblies, such as illustrated in FIG. 3 may be referred to as a "telescoping boom assembly," and the respective boom sections 28,30 may be referred to as an inner boom section 66 and an outer boom section 68. At least a portion of the inner boom section 66 may be formed of a polymer or other dielectric material. The telescoping boom assembly elongates such that the implement 52 can reach a desired location and orientation. For example, as illustrated, the telescoping boom assembly may be used to lift an object.

It should be appreciated that damage is more likely to occur to the insulated boom section while the insulated boom section is in an extended position (e.g., with a majority of the upper boom section 30 protruding out of the lower boom section 28). This is because the lower boom section 28 provides at least some support at a distal end 70, such as at a wear pad, a roller, or other transitional structure.

It should also be appreciated that some boom assemblies may include a combination of a pivoting boom assembly (such as illustrated in FIGS. 1 and 2) and a telescoping boom assembly (such as illustrated in FIG. 3). In some embodiments, the boom assembly 14 includes a pivoting boom assembly configuration in which the upper boom section 30 is a telescoping boom assembly. This provides more versatility in reaching various locations.

Figure 4:
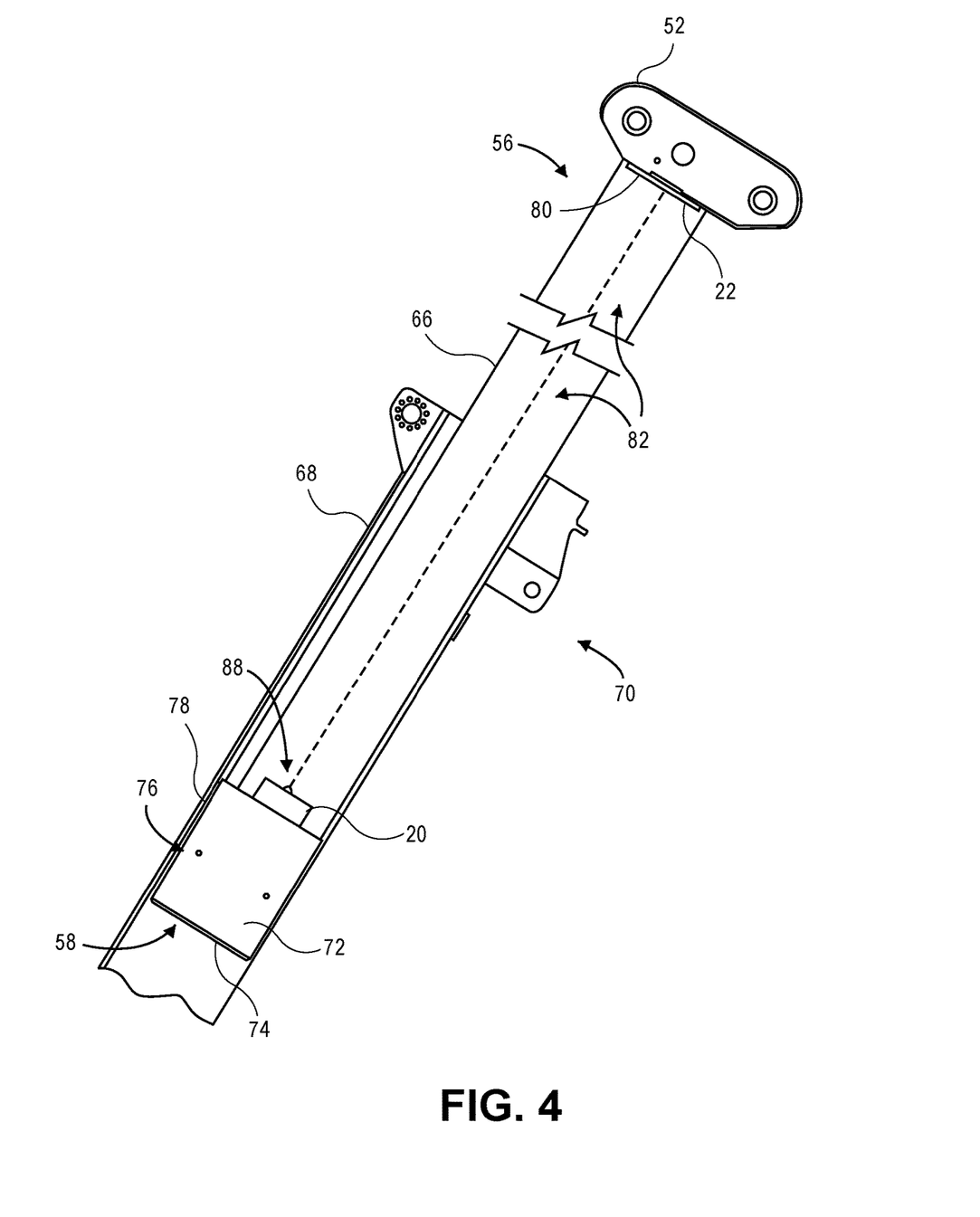
FIG. 4 is a fragmentary cross-sectional view along a length of the boom assembly, illustrating a deflection detection system therein.

FIG. 4 illustrates a fragmentary cross-sectional view along a length of the boom assembly 14, illustrating a deflection detection system 18 therein. In embodiments of the invention the upper boom section 30 further comprises a base segment 72 coupled to a trailing edge 74 of the proximal end 58. The base segment 48 presents a top edge 76. When a load 54 is placed on the distal end 56 of the upper boom section 30, the downward force of the load 54 translates to an upward force on the proximal end 58 of the upper boom section 30. Therefore, at least when the load 54 is relatively heavy and placed on the distal end 56 of the upper boom section 30, the top edge 76 of the base segment 48 is in contact with the interior channel 32 of the lower boom section 28. It should be appreciated that the same would be true if the heavy load 54 was placed on a third inner boom section or a fourth inner boom section, etc., as these forces could damage the upper boom section 30.

As illustrated in FIG. 4, the upper boom section 30 further comprises a wear pad 78. In one embodiment, the wear pad 78 is coupled to the top edge 76 of the base segment 48. In another embodiment, the wear pad 78 is coupled to the interior channel 32 of the lower boom section 28. In still further embodiments, multiple wear pads 70 are utilized. The wear pad 78 has a relatively low coefficient of friction so as to facilitate the translation of the upper boom section 30 within the lower boom section 28. In some embodiments, the wear pad 78 is removably coupled to the upper boom section 30, such that it can be easily replaced upon being damaged or worn.

The upper boom section 30 telescopes to extend out of the lower boom section 28 and retract into the lower boom section 28. A hydraulic cylinder (not illustrated) applies hydraulic power to the upper boom section 30. The hydraulic cylinder is coupled to the base segment of the upper boom section 30 and to the lower boom section 28. In one embodiment of the invention, the hydraulic cylinder acts as a double acting cylinder. In other embodiments, the boom assembly 14 acts as a single acting cylinder. In still further embodiments, the upper boom section 30 telescopes via electrical power.

Figure 6A:
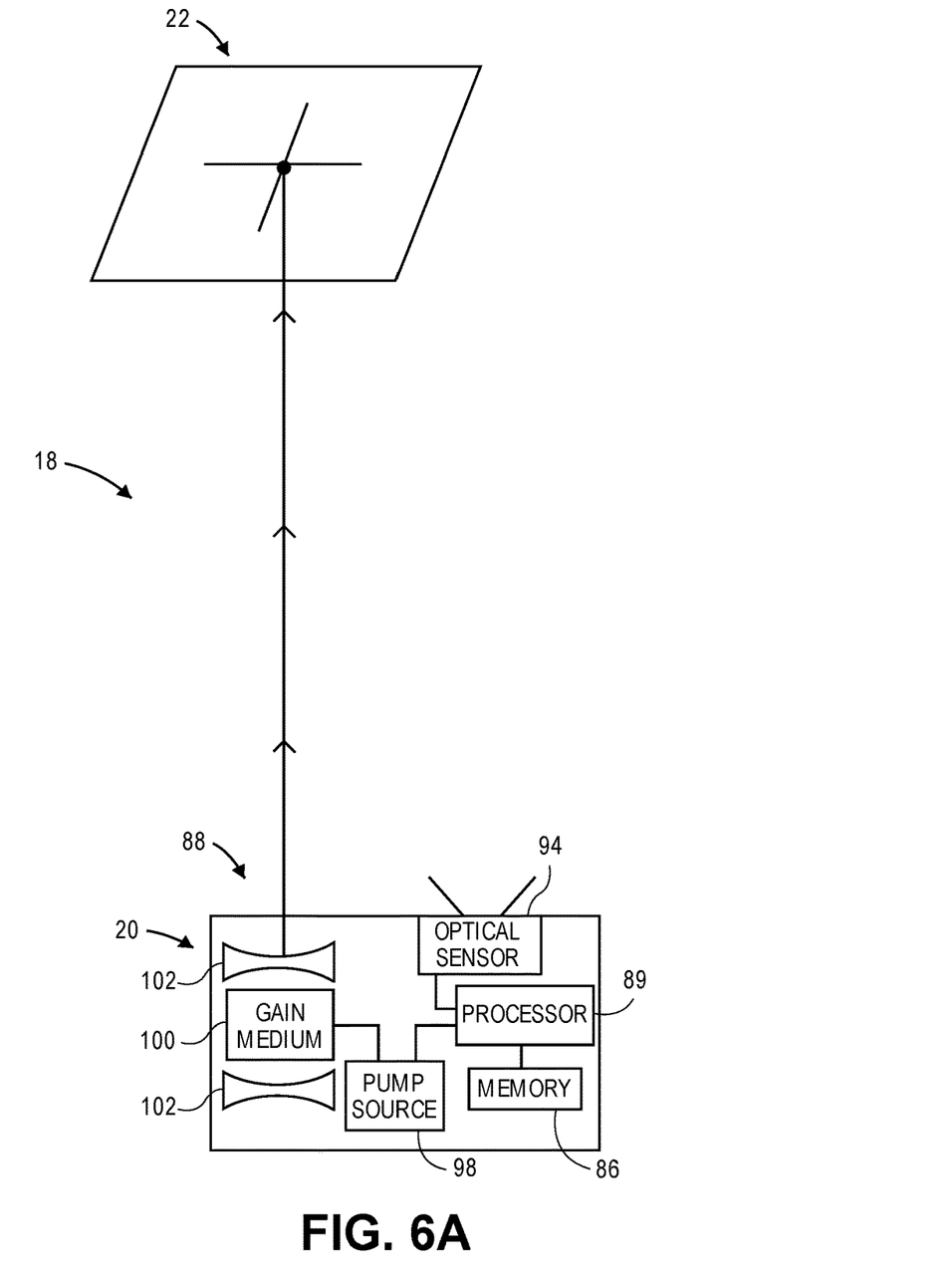
FIG. 6A is a schematic view of an unloaded second embodiment of the deflection detection system, having an optical sensor that detects the beam impact.
Figure 6B:
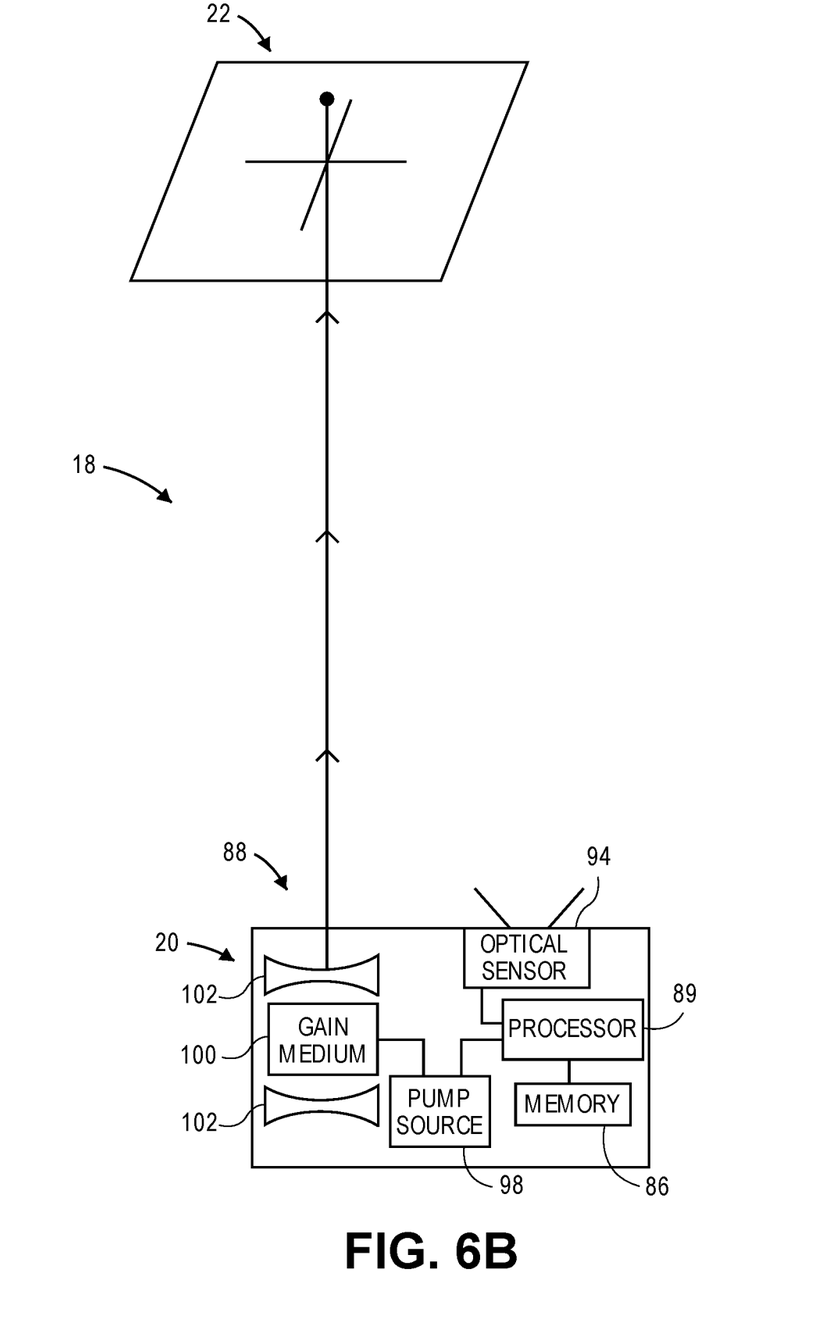
FIG. 6B is a schematic view of a loaded second embodiment of the deflection detection system, having an optical sensor that detects the beam impact

The deflection detection system 18 will now be discussed in more detail. Two embodiments of the deflection detection system 18 are illustrated in FIGS. 5 and 6. FIG. 5, that is FIGS. 5A and 5B, illustrates an exemplary embodiment in which the deflection detection system 18 utilizes an "active" beam target. FIG. 6, that is FIGS. 6A and 6B, illustrates an exemplary embodiment in which the deflection detection system 18 utilizes a "passive" beam target. The active beam target 22 provides a targeting surface 80 onto which the beam impacts and detects the beam impacting thereon. The passive beam target 22 provides the targeting surface 80 onto which the beam impacts but does not detect the beam impacting thereon. The detection is performed by another external component, as discussed below.

FIGS. 5A and 6A illustrate their respective embodiments in an unloaded position. In the unloaded position, the beam may impact at or near a default location. The default location of the beam target 22 is substantially aligned with the beam source 20 when unloaded. In some embodiments, the default location may be marked on the beam target 22, as illustrated. In other embodiments, the default location may be unmarked. In some embodiments, the beam source 20 may be adjusted such that the beam strikes the default location while the boom assembly 14 is unloaded. These adjustments may be performed by adjusting a bracket (not illustrated) or other structure that is securing the beam source 20 so as to change an orientation or translational location of the beam source 20. In other embodiments, the beam source 20 may perform these functions upon starting up, or at another time.

FIGS. 5 and 6 illustrate the beam source 20. The beam source 20 is configured to emit the beam toward the beam target 22. In some embodiments, the beam source 20 is a stand-alone device that is installed into a void 82 of the upper boom section 30 (which may be referred to as a "hollow boom section"). The beam source 20 may alternatively be installed adjacent to the hollow boom section 30, such that the beam is emitted externally to and substantially parallel to the hollow boom section 30 (which may a solid boom section). The beam source 20 may be disposed internally to a void 82 of the upper boom section 30 (such that the upper boom section 30 is a hollow boom section), as best illustrated in FIG. 4. The void 82 may be disposed at least partially within the hollow boom section 30, and disposed longitudinally such that the void 82 traverses the hollow boom section 30. Enclosing the beam source 20 within the void 82 of the upper boom section 30 protects the beam source 20 from being damaged and prevents foreign debris or objects from obstructing the beam. The beam source 20 may additionally or alternatively be disposed externally to the upper boom section 30 (not illustrated). For example, the beam source 20 may be disposed within a channel of the upper boom section 30, on the lower boom section 28, or another location.

In embodiments of the invention, the beam source 20 comprises a processor 84, a memory 86, and a beam production assembly 88. In some embodiments, such as illustrated in FIGS. 5A and 5B, the beam source 20 further comprises a communications element 90. The communications element 90 is configured to retrieve, request, receive, or otherwise acquire the target-impact indication (which is indicative of where on the beam target 22 the beam is striking). The communications element 90 may sample the beam target 22, receive an electrical signal indicative of a photovoltaic sensor 92 or photovoltaic sensors 92 that has detected the beam. The photovoltaic sensors 92 are disposed in, on, behind, adjacent to, or otherwise associated with the beam target 22. The photovoltaic sensors 92 directly detect the presence of the beam thereon by providing power to a certain circuit or providing another indication. Based upon which photovoltaic sensors 92 are being activated by the beam, the beam-impact location can be determined. In other embodiments, such as illustrated in FIGS. 6A and 6B, the beam source 20 further comprises an optical sensor 94 configured to detect the beam impact on the beam target 22 from the beam source 20 or other intermediate location. The optical sensor 94 indirectly determines the beam-impact location by observing the beam target 22 from another location.

In other embodiments, not illustrated, the beam source 20 comprises the beam production assembly 88. In these embodiments, the beam source 20 is a passive component that is controlled by an external system (such as a primary vehicle control system). In these embodiments, the beam source 20 is turned on by providing electrical power, or a power-on signal, to the beam source 20 from the external system (either directly or indirectly).

In some embodiments, the beam source 20 is a laser. A 96, as schematically illustrated in FIGS. 5 and 6, is comprised of a pump source 98, a gain medium 100, and an optical resonator 102. The pump source 98 is the power supply that provides the energy for the laser beam. Energy from the pump source 98 excites the gain medium 100 to produce an emission of photons. The gain medium 100 concentrates the photons. The gain medium 100 also determines the laser beam's frequency. The optical resonator 102 comprises a highly reflective mirror and a partially reflective mirror. The optical resonator 102 allows the laser beam to pass through the partially reflective mirror, such that it is a highly concentrated beam of energy. Some embodiments of the laser comprise a plurality of gain mediums 100 and optical resonators 102.

In embodiments of the invention, a computing unit may be utilized for estimating a total load emplaced on the insulated boom section 30 and comparing the total load to a maximum allowable load. The computing unit may be the processor 84 (as illustrated in FIGS. 5 and 6) and/or a processor associated with a central control unit for the aerial device 10 (not illustrated). For example, the insulated boom section 30 may have a maximum allowable safe load of four hundred pounds. The central computer therefore utilizes the deflection detection system 18 to determine or estimate the load on the insulated boom section 30. In order to accomplish this, the deflection detection system 18 is communicatively coupled with a central computing unit for calculating a total load on the insulated boom section 30. The calculation of the total load is discussed in more depth below.

In embodiments of the invention, the central computing unit is communicatively coupled with the alarm 24. The alarm 24 is used to alert the utility worker of potential structural damage to the insulated boom section 30. In some embodiments of the invention, the alarm 24 is a component of or associated with the deflection detection system 18. In other embodiments, the alarm 24 is a component of the deflection detection system 18. In still other embodiments, the alarm 24 is a component of or associated with the central computing unit.

In some embodiments, the alarm 24 presents the utility worker with a visual indication, an audible indication, or other type of indication to let the utility worker know that a potentially unsafe condition exists within the insulated upper boom section 30. In some embodiments, the alarm 24 is configured to communicate with a remote, external computer system. The external computer system may be associated with a headquarters location, a maintenance location, supervisor location, or other location. This allows corrective action to be taken and monitored.

In some embodiments of the invention, the components discussed herein are utilized with other strain- and load-detection devices of the prior art. In one embodiment, a four-bar linkage is utilized to connect the distal end 56 of the insulated boom section 30 to the utility platform assembly 16. A substantially vertically-oriented hydraulic cylinder may be disposed within the four-bar linkage. In other embodiments, this hydraulic cylinder may additionally or alternatively be an electronic load cell or a strain gauge.

Various methods of the invention will now be discussed. A method of protecting a boom section so as to prevent failure of the boom section is illustrated in FIG. 6. The processor 84 may be configured to perform at least a portion of the discussed steps. In some embodiments, the processor 84 is internal to a beam source 20 housing. In other embodiments, the processor 84 is associated with a primary control system of the aerial device 10 (e.g., to control the various systems of the aerial device 10). It should also be appreciated that various processors may perform any number of the below-described steps. Embodiments of the invention may be directed to a non-transitory computer readable medium (such as the memory 86) having a computer program stored thereon. The computer program instructs the processor 84 to perform the below-discussed steps.

Figure 7:
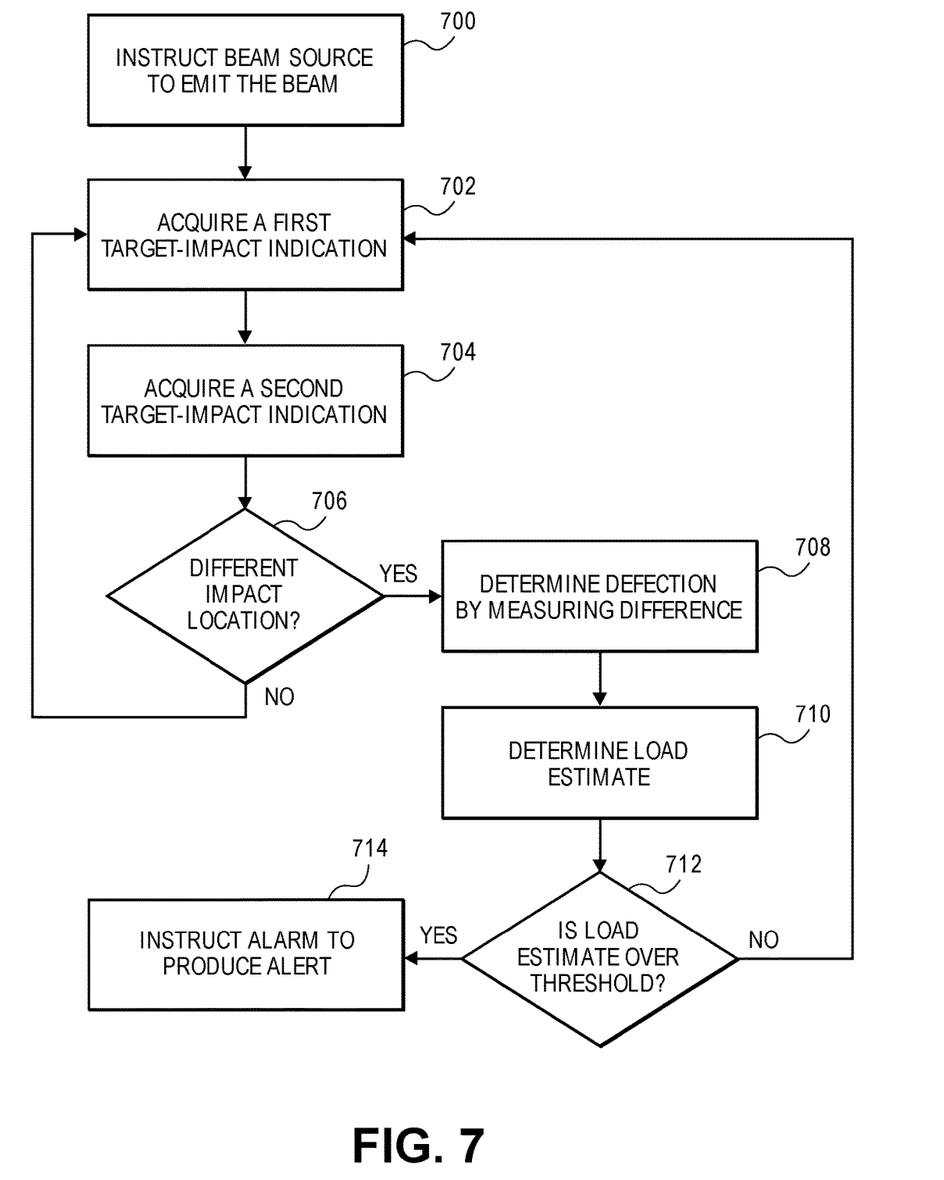
FIG. 7 is a flow diagram illustrating exemplary steps performed by a processor in estimating a load on the upper boom section.

In Step 600, the processor 84 instructs the beam source 20 to emit the beam. The processor 84 may instruct the beam source 20 to emit the beam based upon any of various criteria. For example, the criteria may be the powering-on of the aerial device 10. Other exemplary criteria may include the boom assembly 14 beginning to deploy, a load 54 being detected on the boom assembly 14 by another sensor, the deploying of a load-inducing component (such as a jib 44, a winch 48, a digger derrick, a pole guide, or other implement 52), the deploying of outriggers, the selection by the operator of a certain mode of operation.

In Step 602, the processor 84 acquires a first target-impact indication. The processor 84 may acquire the first target-impact indication in any of various methods. For example, the processor 84 may request, retrieve, instruct, or otherwise acquire the target-impact indication from the communications element 90 (and from the photovoltaic sensors 92 and/or a processor 84 associated therewith). As another example, the processor 84 may request, retrieve, instruct, or otherwise acquire the target-impact indication from the optical sensor 94 (e.g., to determine the location in which the beam is impacting the beam target 22).

In some instances, the first target-impact indication is associated with a default, unloaded location. The default location is associated with a substantially straight insulated boom section 30, e.g., not under a load 54. However, even the weight of the insulated boom section 30 itself and other standard equipment at the distal end 36 of the boom assembly 14 (such as the utility platform assembly 16 and other implements 52) impart a stress and a strain on the insulated boom section 30. As such, the default location may be a hypothetical location that is straight. In other embodiments, the default location may be the starting position, e.g., before the boom assembly 14 is deployed and any additional loads are added thereto.

In Step 604, the processor 84 acquires a second target-impact indication. In embodiments of the invention, the processor 84 acquires the second target-impact indication in a similar manner as the first target-impact indication was acquired in Step 602. In some embodiments of the Step 602 and 604 may be performed at any of various times. For example, the target-impact indication may be performed at various intervals, such as more than ten times per second, more than five times per second, more than once per second, or another interval. In some embodiments of the invention, the interval may be determined (at least in part) based upon the current load on the system. For example, the interval may decrease (such that target-impact indications are more frequent) as the estimated load increases.

In Step 606, the processor 84 determines whether the impact locations are different. If the first target-impact indication and the second target-impact indication are indicative of the same location (e.g., the impact locations are not different), the processor 84 may then determine that the load on the boom assembly 14 has not changed between a time T1 (when the first target-impact indication was acquired) and a time T2 (when the second-target impact indication was acquired). It should be appreciated that any time may be referred to as the time T1 and time T2. For example, the time T1 could be the time associated with an initial target-impact indication, and the time T2 could be the time associated with a second target-impact indication (acquired after a single iteration of the interval). As another example, the time T1 could be associated with the initial target-impact indication, and the time T2 could be associated with a final target-impact indication. In some embodiments, Successive iterations of the discussed method may utilize the initial target-impact indication (or other baseline indication) and compare to each successive target-impact indication.

If the impact locations are different, in Step 608 the processor 84 determines the deflection by measuring a distance between the two locations. The measured distance is indicative of an amount that the insulated boom section 30 has deflected. The measured distance may be expressed as a linear distance, a radial distance, a percentage (such as a percentage of a total allowable deflection), a ratio, or other expression. The measured distance is determined at least in part by the relative positions of the first target-impact indication and the second target-impact indication.

In some embodiments, the second target-location indication has a horizontal component and a vertical component (e.g., relative to the default position of the first target-location indication). The horizontal component and the vertical component are measures of the amount to which the insulated boom section 30 has displaced horizontally and/or vertically. For example, the insulated boom section 30 may have a measured distance of 5 cm. The 5 cm measured distance may include a 4 cm vertical component and the 3 cm horizontal component (such that the 5 cm measured distance is the hypotenuse of a standard 3-4-5 right triangle). The vertical component is indicative of a vertical load on the hollow boom section 30. The horizontal component is indicative of a side load on the hollow boom section 30. The separation of the vertical load and the side load may be determined based upon the boom section having different load tolerances for vertical versus side loads. For example, boom assemblies are typically configured to withstand great vertical loads, but lesser side loads. This is because the largest loads placed on a boom assembly 14 are typically in a vertical direction. The below-discussed thresholds may be dependent upon the horizontal component, the vertical component, and/or the total measured distance.

In Step 610, the processor 84 determines a load estimate. In addition to the measured deflection, the load estimate may be based, at least in part, on the current orientation of the boom assembly 14. For example, the orientation of the boom assembly 14 may include the angle at which the various boom sections 28,30 are disposed, the amount which the various boom sections 28,30 are telescoped, the orientation of any implements 52 on the boom assembly 14, the rotation of the boom assembly 14 relative to the chassis, or other considerations.

In Step 612, the processor 84 determines if the load estimate is over a certain threshold. The processor 84 may compare the threshold against the load estimate, the measured displacement, the vertical component, the horizontal component, and/or another measurement associated with the boom displacement. The threshold may be associated with a maximum safe operating load for the hollow boom section 30. The threshold may also include a set of intermediate thresholds, such that each successive threshold is indicative of approaching the maximum safe operating load for the boom section.

If the processor 84 determines that the load estimate is not above the threshold, the processor 84 may return to Step 602 or Step 604 and continue monitoring the load 54 on the insulated boom section 30 for excessive loads. If the processor 84 determines that the load estimate is above the threshold, the processor 84, in Step 614, the processor 84 instructs an alarm 24 to produce an alert to the operator. The alarm 24 is discussed above. The alarm 24 may be indicative that the load estimate has reached, surpassed, or is approaching a threshold (such as the maximum safe operating load for the boom section).

In some embodiments, the method may also include sending, to an external computing system, an indication that the total strain is above the certain threshold. This step of sending the indication may be performed remotely and substantially in real time, so as to allow an administrator to ensure that corrective actions are taken.

It should be appreciated that, while the above disclosure has been generally directed to the field of aerial work platforms, embodiments of the invention may be directed to other fields and uses. For example, embodiments of the invention may be utilized in conjunction with metal boom sections, cranes, and other platforms. Still other embodiments of the invention may be used in virtually any field or application in which four-bar linkages are common. For example, various embodiments of the invention can be utilized to determine strain on virtually any physical structure.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A deflection detection system comprising:
a beam source configured to be installed into a hollow boom section at a first end, said beam source being configured to emit a beam;
a beam target configured to be installed into the hollow boom section at a second end that is opposite the first end; and
a processor configured to:
instruct the beam source to emit the beam;
acquire a first target-impact indication that is associated with a first impact location of the beam on the beam target;
acquire a second target-impact indication that is associated with an impact location of the beam on the beam target; and
determine a deflection of the hollow boom section based at least in part on the first target-location and the second target-location indication.

2. The deflection detection system of claim 1, wherein the beam source is a laser source,
wherein the beam is a laser.

3. The deflection detection system of claim 1, wherein the processor is disposed within a beam source housing.

4. The deflection detection system of claim 1, wherein the hollow boom section is substantially unloaded when the first target-impact indication is acquired,
wherein the hollow boom section is under a load when the second target-impact indication is acquired.

5. The deflection detection system of claim 1,
wherein the second target-location indication has a horizontal component and a vertical component,
wherein the vertical component is indicative of a vertical load on the hollow boom section,
wherein the horizontal component is indicative of a side load on the hollow boom section.

6. The deflection detection system of claim 1,
wherein the first target-location indication and the second target-location indication are each acquired from the beam target,
wherein the beam target includes a set of beam sensor each configured to detect the beam thereon,
wherein the beam target is configured to send a signal indicative of at least one beam sensor detecting the beam target.

7. The deflection detection system of claim 1,
wherein the first target-location indication and the second target-location indication are each acquired from an optical sensor,
wherein the optical sensor is configured to be oriented toward the beam target.

8. The deflection detection system of claim 1, wherein the processor is further configured to:
determine a load estimate for a load on the hollow boom section.

9. The deflection detection system of claim 8, wherein the processor is further configured to:
compare the load estimate to a load threshold for the hollow boom section,
wherein the load threshold is associated with a maximum safe operating load for the hollow boom section.

10. The deflection detection system of claim 9, wherein the processor is further configured to:
instruct, upon a determination that the load estimate is above the load threshold, an alarm to provide an alert to the operator such that the operator can take mitigating actions to prevent damage to the hollow boom section.

11. The deflection detection system of claim 8,
wherein the hollow boom section is configured to be installed into a boom assembly of an aerial device,
wherein the deflection detection system is configured to measure a load on the boom assembly.

12. A deflection detection system comprising:
a beam source configured to be installed on a boom section at a first end, said beam source being configured to emit a beam;
a beam target configured to be installed the boom section at a second end that is opposite the first end,
wherein the beam source is configured to emit the beam to the beam target;
a detector; and
a processor configured to detect, via the detector, a deflection of the boom section based at least in part on where the beam strikes the beam target, wherein the processor is configured to: instruct the beam source to emit the beam; acquire a first target-impact indication that is associated with a first impact location of the beam on the beam target; acquire a second target-impact indication that is associated with an impact location of the beam on the beam target; and determine a deflection of the hollow boom section based at least in part on the first target-location and the second target-location indication.

13. The deflection detection assembly of claim 12,
wherein the first end is a lower end of the boom section,
wherein the second end is an upper end of the boom section.

14. The deflection detection system of claim 12,
wherein the boom section is at least partially hollow to present a void,
wherein the beam source and the beam target are each configured to be installed into the void.

15. The deflection detection system of claim 11,
wherein the beam source is a laser source,
wherein the beam is a laser.

16. The deflection detection system of claim 12, wherein the processor is disposed within a beam source housing.

17. The deflection detection system of claim 12,
wherein the beam target includes a set of beam sensor each configured to detect the beam thereon,
wherein the beam target is configured to send a signal indicative of at least one beam sensor detecting the beam target.

18. The deflection detection system of claim 12, further comprising:
an optical sensor configured to be oriented toward the beam target.

19. A deflection detection system comprising:
a hollow boom section having a first end and a second end opposite the first end, wherein the hollow boom section presents a void therein;
a beam source installed in the void of the hollow boom section at the first end, said beam source being configured to emit a beam;
a detector; and
a beam target installed in the hollow boom section at the second end, wherein the beam source is directed to the beam target such that a deflection of the hollow boom section may be detected via the detector based at least in part on where the beam impacts the target, wherein a processor, via the detector, for instructing the beam source to emit the beam; acquiring a first target-impact indication that is associated with a first impact location of the beam on the beam target; acquiring a second target-impact indication that is associated with an impact location of the beam on the beam target; and determining a deflection of the hollow boom section based at least in part on the first target-location and the second target-location indication.

* * * * *